INVENTORS: W. B. GAUNT, JR.
G. B. THOMAS, JR.
BY
R. C. Winter
ATTORNEY

United States Patent Office 3,315,036

Patented Apr. 18, 1967

3,315,036

RESONANT TRANSFER TIME DIVISION MULTIPLEX SYSTEM UTILIZING NEGATIVE IMPEDANCE AMPLIFICATION MEANS

Wilmer B. Gaunt, Jr., Lincroft, and George B. Thomas, Jr., Summit, N.J., assignors to Bell Telephone Laboratories, Incorporated, New York, N.Y., a corporation of New York Filed Aug. 16, 1963, Ser. No. 302,507
6 Claims. (Cl. 179—15)

Figure 1:
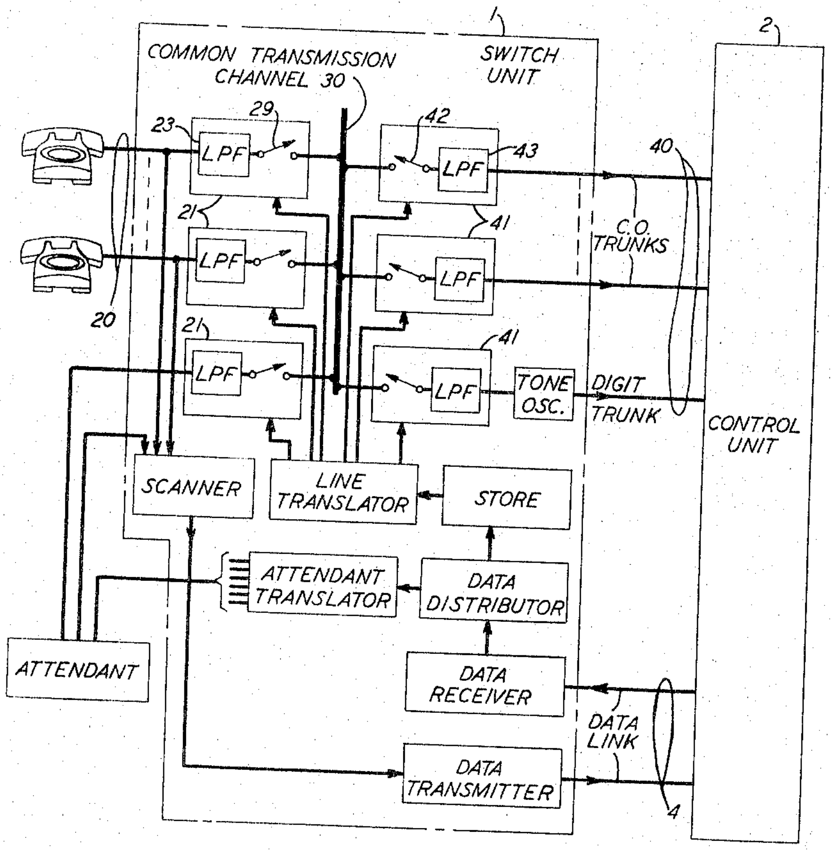

This invention relates to electrical transmission circuits and, more particularly, to transmission circuits including gating networks applicable to information processing and transfer.

A practice receiving widespread attention in high speed information-handling systems is the time-sharing of a common communication channel among a plurality of information sources communicating in pairs. Time-sharing or time division multiplexing requires that in successive, short time intervals each pair of information sources or terminals in communication be assigned a frequently recurring discrete interval of time or time slot during which information may be interchanged via the common channel. Between the cyclic appearances of a time slot assigned to a particular pair of terminals, the common channel is available to other communicating pairs of terminals in their respective pre-assigned time slots.

Time-sharing may be utilized, for example, in a telephone system wherein connection of a plurality of communicating pairs of telephone lines is implemented via a common communication channel, thereby realizing a substantial reduction in expensive transmission facilities. A system of this type is described, for example, in R. C. Gebhardt et al. patent application Ser. No. 195,199, filed May 16, 1962, now Patent No. 3,225,244.

The accurate reproduction of cyclically sampled information transmitted over a common channel between a plurality of communicating pairs of terminals depends upon strict minimization of signal losses in transfer as well as sampling at a prescribed rate. Among the factors tending to produce losses in such a system is the impedance of the gating circuits which periodically connect the lines to the common channel. Such impedance varies appreciably among the large number of line circuits connected to the common channel, thus presenting a severe impedance mismatch problem upon line interconnection. The resulting interference with the voice samples being transferred through the common channel may be sufficient to affect the intelligibility of a telephone conversation.

The sampling technique utilized in the aforementioned Gebhardt et al. application is based upon a principle referred to as "resonant transfer," a circuit for the operation of which is disclosed in W. D. Lewis Patent 2,936,337, issued May 10, 1960. Operation in accordance with this principle permits sampling of the information at a particular terminal by operation of a gate between the terminal and the common channel during a discrete time slot of a repetitive cycle of time slots. The length of time that the gate remains operated is established by the time required for transfer of an information sample through the gate from one storage means to a second storage means in a circuit including an inductive element in series with the storage means and gate. After one half-cycle at the resonant frequency of the tuned circuit formed by these elements, transfer of the information sample is complete, and before any retransfer of the sample through the gate can be effected, the gate circuit is disabled.

The foregoing explanation covers the situation in which the transfer is effected between storage means having equal capacitance. However, the resonant transfer operation is substantially the same when storage means having unequal capacitance are interconnected, as, for example, in a line-to-trunk connection. Such an operation is disclosed in a patent application of H. S. Feder and G. B. Thomas, Jr., Serial No. 51,352, filed August 23, 1960, now Patent No. 3,118,019.

Theoretically, resonant transfer is accomplished without loss. However, considering the loss encountered in each line gate and the stray capacitance present in the common channel, a harmful crosstalk level may be encountered, resulting in imperfect signal transfer.

The line gates proposed for use in the Gebhardt et al. system are arranged for bilateral transmission in an unbalanced network. Such gates are effective in reducing leakage losses to a minimum. Nevertheless, a finite impedance is encountered in transfer, producing the losses indicated heretofore. Also the impedance varies among the numerous gates connected to the common channel in pairs in each discrete time interval, thus aggravating the impedance mismatch problem.

Efforts to improve the over-all system performance have led to the use of negative impedance converters in the common transmission channel, as disclosed for example in the abandoned W. B. Gaunt, Jr., application Serial No. 204,932, filed June 25, 1962. In this application the magnitude of the negative impedance is increased to the point that oscillations in the resonant transfer circuit are forced. This expedient results in a balance between the energy loss per cycle and the energy gain per cycle. It also results in an average circuit resistance which is near zero. Thus transmission of voice band signals through the oscillating resonant transfer circuit is virtually lossless. Also, with the varying impedance of the numerous gates, the amplitude of the oscillations also varies to satisfy the energy balance requirement inherent in an oscillating system, thus providing a self-adjusting operation which maintains the lossless signal transfer.

Various problems are encountered through the utilization of this negative impedance in the resonant transfer circuit and which establish limitations on the circuit operation. For example, the oscillations occur at one-half the sampling frequency, thereby establishing an upper limit on the voice frequency that can be transmitted at one-fourth the sampling frequency. This means that in order to transmit the required highest voice frequency, the system sampling frequency must be twice that of a nonoscillatory system. In a communication system this requires that the number of time slots available for simultaneous conversations must be cut in two.

Losses in the line circuits, which represent a large portion of the total system loss, are not affected by the presence of the negative impedance converter. Also the large magnitude of the oscillations due to the negative impedance converter requires additional filtering. The problem presented on line-to-line connections is essentially that of insertion loss together with the oscillatory mode disturbance which creates a slight ringing. Such losses and noise are not of sufficient moment to require additional corrective measures. However line-to-trunk connections, which involve considerably longer distances between terminals, are further degraded by echo or return loss which is sufficient when combined with insertion loss and oscillatory noise to render such connections unsuitable.

It is, therefore, a general object of this invention to provide an improved signal transfer circuit.

It is another object of this invention to improve the performance of a signal transfer circuit including a negative impedance converter.

More specifically, it is an object of this invention to reduce line losses and suppress or render inaudible the oscillations produced by the negative impedance converter in the signal transfer circuit on calls involving line-to-trunk connections.

These and other objects of this invention are attained in one specific illustrative embodiment wherein a time division switching system of the type described in the aforementioned application of W. B. Gaunt, Jr., comprises a line gate individual to each circuit, each line gate serving to connect storage means in the corresponding line circuit to a common communication channel during a selected, cyclically recurring time interval.

The storage means in each line circuit comprises capacitance means, and, upon concurrent enablement of the line gates for a pair of lines in communication, a series circuit is completed through the common channel including the storage capacitance of each line and inductance means. The line gates are enabled for a period equivalent to one half-cycle at the resonant frequency of the series circuit such that a resonant transfer of signals stored in the respective shunt capacitance is effected.

The timing of the gate operation in this system is arranged such that a pair of gates corresponding to lines in communication are operated simultaneously to effect an interchange of information therebetween. Upon completion of such transfer, the pair of line gates is disabled, and any signal remaining in the common channel is removed by a clamping operation. Thereafter, the next communicating pair of line circuits have their respective line gates enabled.

The common channel comprises a negative impedance converter connected in series, in shunt to ground or a combination of the two, and having an impedance value which is greater than the sum of the impedances encountered in any pair of interconnected line gates. This negative impedance value results in oscillation at one-half the sampling frequency within the resonant transfer circuit including the pair of interconnected line gates. Voice frequency signals introduced into this regenerative system are superimposed upon or modulate the oscillations. In this fashion the voice frequency signals experience no loss in transfer from one line circuit or trunk to the interconnected line circuit or trunk.

The oscillatory mode produced by the negative impedance converter is suppressed on calls involving line-to-trunk interconnections by including an antiresonant circuit in the resonant transfer circuit completed between the line and trunk through the common transmission channel. Advantageously, the antiresonant circuit is included in the trunk side of the resonant transfer circuit. In this fashion degradation of signal in line-to-trunk connections due to the oscillatory mode is overcome.

On line-to-line connections the degradation is not sufficient to be objectionable to the talking parties. However, in trunk connections to other exchanges or central offices over considerable distances where echo or return loss is a decided factor, such degradation may disrupt the conversations between interconnected parties. Thus the line filters are maintained in a relatively simple configuration with the more complex circuitry arising from the presence of the antiresonant circuit confined to the lesser number of trunk circuits.

Thus it may be seen that the unique combination including a negative impedance converter in the common channel and an antiresonant circuit in the resonant transfer circuit provides virtually lossless signal transfer through a communication system operating on a time division basis. Since the oscillatory mode produced by the negative impedance converter can be suppressed, the sampling frequency may be proportionately reduced with a consequent increase in the number of time slots available for system use.

It is a feature of this invention that in a time division communication system the resonant transfer circuit produced by an interconnection of active circuits via a common communication channel comprise means for suppressing the oscillations produced by a negative impedance converter in the common communication channel.

It is another features of this invention that the suppression means comprise a filter.

It is a further feature of this invention that the suppression means comprise an antiresonant circuit.

More particularly, it is a feature of this invention that the antiresonant circuit include inductance means and capacitance means connected in shunt.

It is another feature of this invention that the interconnected circuits comprise a line and a trunk and that the antiresonant circuit be included in the trunk side of the resonant transfer circuit.

Figure 2:
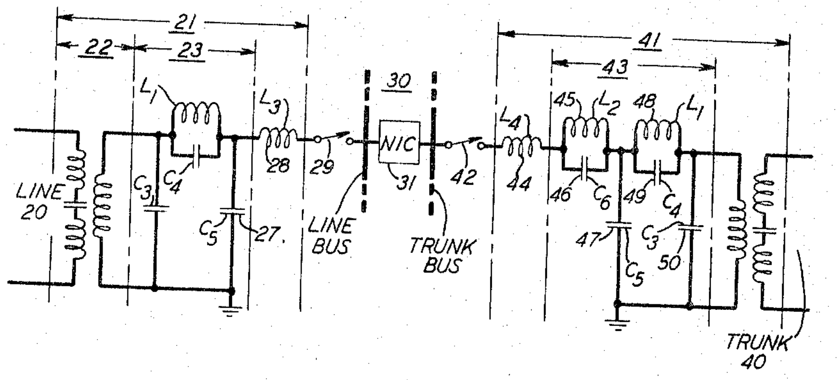

A complete understanding of these and other features of the invention may be gained from consideration of the following detailed description, together with the accompanying drawing, in which:

FIG. 1 is a schematic representation of a time division switching network in a telephone system in which the arrangement in accordance with this invention may be employed; and FIG. 2 is a schematic representation of a time division switching and resonant transfer arrangement in accordance with this invention which may be employed in the telephone system of FIG. 1.

Turning now to the drawing, the basic elements of a time division communication system in which our invention may be incorporated are depicted in FIG. 1. The illustrated embodiment is a private branch exchange (PBX) wherein a plurality of telephone lines in a community of common interest are connected to a control unit via data links such that they may be interconnected to establish communication with each other. A system of this type is disclosed, for example, in the aforementioned Gebhardt et al. application. A plurality of trunks are also connected through the control unit to other switching centers and the telephone lines connected thereto.

A plurality of telephones are individually connected via telephone lines 20 through line circuits 21 to a common communication channel 30. The individual line circuits 21 each comprise a filter 23 and gate 29. Similarly, individually connected to the common communication channel 30 are a plurality of trunks 40 each connected thereto via individual trunk circuits 41 comprising a gate 42 and a filter 43.

The system is operated on a time division multiplex basis in which each line 20 desiring service is assigned a time slot in a recurrent cycle of time slots. Upon each occurrence of the time slot assigned to a particular calling line, a sample of information is transferred from that line through the corresponding gate 29 to the common channel 30 and thence through a similar line gate 29 or trunk gate 42 to the corresponding called line 20 or trunk 40.

Information as to the condition of a line 20; e.g., idle, busy on an established connection, or desiring to have a connection established to it, is processed by the control unit 2 and transmitted to the remote switching unit 1 via data links 4. The switching unit 1 serves to transmit control signals to selected line and trunk gates 29 and 42, respectively, upon receipt of appropriate directive signals from the control unit 2. The resultant connections and disconnections of the line and trunk gates occur in a selected sequence for precisely timed intervals during which signal samples are transferred between the lines 20 or between lines 20 and trunks 40 via the common channel 30.

FIG. 2 illustrates a typical talking path established between one of the lines 20 and one of the trunks 40 in a predetermined time slot in the recurring cycle of time slots. Such a circuit utilizes the now familiar resonant transfer operation disclosed in the aforementioned W. D. Lewis patent. Line 20 and trunk 40 are connected to the common channel 30 by the line gate 29 and the trunk gate 42, respectively, during the predetermined time slot.

A signal sample from line 20 stored in the grounded line storage capacitance 27 at the output of the filter 23 is then transferred through a resonant transfer inductance 28, the associated active line gate 29, common channel 30, associated trunk gate 42, resonant transfer inductance 44, and an antiresonant circuit comprising inductance 45 and capacitance 46 to the grounded trunk storage capacitance 47.

The transfer operation requires that the line and trunk gates 29 and 42 be disabled after sufficient time has elapsed for a complete transfer of stored energy from one storage capacitance to the other. This time interval is equivalent to one half-cycle at the resonant frequency of the tuned circuit including the storage capacitors 27 and 47, the resonant transfer inductors 28 and 44, gates 29 and 42, and common channel 30.

Theoretically, the gates display an infinite impedance to the transfer of signals when in the disabled state, and zero impedance when in the enabled state. Such gate conditions, coupled with a theoretical lossless resonant transfer operation, are not fully realized in practice due in part to imperfect gates. The losses produced by this and other sources in systems involving a large number of lines may be overcome by the employment of a negative impedance converter 31 in the common channel 30, as disclosed for example in the aforementioned W. B. Gaunt, Jr. application. As discussed in this application, the desired result is obtained by intentionally permitting oscillations in the resonant transfer circuit. The resulting oscillation current increases to a level at which the resonant transfer circuit impedance, including that of the gates, is averaged to zero.

The presence of such sustained oscillations serves to limit the available voice frequency bandwidth, thus requiring an increase in the sampling frequency to permit transmission of the highest voice frequency and a consequent reduction in available time slots. Also filtering requirements are more demanding, due to losses other than those affected by the presence of the negative impedance converter.

We have found that the problems encountered by the presence of the negative impedance converter in the resonant transfer circuit may be solved by the unique circuit arrangement illustrated in FIG. 2, including the antiresonant circuit comprising a parallel arrangement of inductance 45 and capacitance 46. This arrangement is connected in the trunk circuit 41 between the resonant transfer inductance 44 and the storage capacitance 47 so as to form a part of the resonant transfer circuit when established between a line and a trunk.

Initially the problem was solved by connecting a band pass filter to the resonant transfer portion of each trunk circuit so as to divert the oscillations produced by the negative impedance converter. This expedient was successful in confining the unwanted oscillations in line-to-trunk connections, but it required a complex filter in each trunk circuit in addition to the low pass filter already included therein, the latter filter continuing to perform the function of passing only the signals in the speech band. We then discovered that filter elements may be saved by devising some means to suppress rather than to divert the oscillations due to the negative impedance. Thus a simple filter arrangement of inductance 45 and capacitance 46 in shunt, as described heretofore, was inserted in the resonant transfer circuit. By tuning this filter section to a frequency approximating the fundamental of the unwanted oscillatory mode, we found that this oscillatory mode could be entirely suppressed without affecting the desired information signals. Furthermore, use of this simple circuit made it possible to adjust the negative impedance converter elements for optimum high return loss and a nominal zero decibel insertion loss from signal input to output. Thus all of the usual filter losses were removed as well. Also, since the oscillatory mode was suppressed or rendered inaudible with this unique circuit arrangement, the sampling frequency could be reduced, with a consequent increase in the number of time slots available for system operation.

A typical arrangement utilizing this circuit results in zero decibel nominal insertion loss and 28 decibel echo return loss measured over the band. With this typical circuit operating at a sampling frequency of 12.5 kilocycles, the elements shown in FIG. 2 may be assigned values as follows:

$L_1$=565 millihenrys
$L_2$=152.5 millihenrys
$L_3$=9.441 microhenrys
$L_4$=24.73 microhenrys
$C_1$=3.2 microfarads
$C_2$=1.23 microfarads
$C_3$=.0044 microfarad
$C_4$=286 micromicrofarads
$C_5$=.0066 microfarad
$C_6$=.00424 microfarad Each $L_1$, $C_4$ combination resonates at 12.5 kilocycles. Each $L_2$, $C_6$ combination resonates at 6.25 kilocycles. The gates close for 0.8 microsecond at a 12.5 kilocycle rate. An arbitary bandwidth of 4 kilocycles in the lines is assumed.

It is to be understood that the above-described arrangements are illustrative of the application of the principles of the inveniton. Numerous other arrangements may be devised by those skilled in the art without departing from the spirit and scope of the invention.

What is claimed is:

1. A resonant transfer circuit comprising signal storage means, inductance means, a transmission channel including a sustained oscillation producing negative impedance means, gating means for conecting said storage and inductance means simultaneously to said channel in one of a plurality of distinct time intervals in a repetitive cycle, and means for rendering inaudible said sustained oscillations produced in the resonant transfer circuit by said negative impedance means.

2. A resonant transfer circuit according to claim 1 wherein said means for rendering inaudible said sustained oscillations comprises a network having positive resistive components tuned to substantially the frequency of said oscillations.

3. A resonant transfer circuit according to claim 2 wherein said network comprises a parallel arrangement of capacitance and inductance elements connected in said resonant transfer circuit in series.

4. A time division switching system comprising a plurality of line circuits each including resonant transfer means, a plurality of trunk circuits each including resonant transfer means, a common transmission channel including negative impedance means for introducing oscillations into said channel, and gate means for simultaneously connecting a pair of said line and trunk circuits, each of said trunk circuit resonant transfer means further including filter means antiresonant at substantially the frequency of said oscillations.

5. A time division switching system comprising a plurality of communication paths each terminated in capacitance means, a common transmission channel, gating means for connecting pairs of said paths simultaneously to said channel, and means including inductance means and negative impedance converter means for providing a sustained oscillation producing resonant transfer circuit between respective capacitance means when said pairs of lines are connected to said channel, said resonant transfer circuit further including a series-connected antiresonant circuit tuned substantially to the frequency of said oscillations.

6. In a combination system, a plurality of lines terminated in capacitance means, certain of said lines comprising trunk circuits, a common transmission channel, gating means for connecting a pair of said lines to said channel in a discrete time slot of a repetetive cycle of time slots, and means comprising inductance means and a negative impedance converter for providing an oscillation producing resonant transfer circuit when said pair of lines is connected to said channel, said resonant transfer circuit further comprising filter means having positive resistive components connected between said capacitance means and said gating means in each of said trunk circuits for rendering inaudible the oscillations produced by said negative impedance converter.

References Cited by the Examiner

UNITED STATES PATENTS

| | | | |
|---|---|---|---|
| 3,117,185 | 1/1964 | Adelaar | 179—15 |
| 3,182,133 | 5/1965 | Schlichte | 179—15 |

DAVID G. REDINBAUGH, *Primary Examiner.*

ROBERT L. GRIFFIN, *Examiner.*